US009238194B2

United States Patent
Liu et al.

(10) Patent No.: US 9,238,194 B2
(45) Date of Patent: *Jan. 19, 2016

(54) NANOPOROUS MACROCYCLE-CONTAINING CROSS-LINKED POLYMERIC MEMBRANES FOR SEPARATIONS

(71) Applicant: UOP LLC, Des Plaines, IL (US)

(72) Inventors: Chunqing Liu, Arlington Heights, IL (US); Howie Q. Tran, Skokie, IL (US); Nicole K. Karns, Chicago, IL (US); Travis C. Bowen, Crystal Lake, IL (US)

(73) Assignee: UOP LLC, Des Plaines, IL (US)

( * ) Notice: Subject to any disclaimer, the term of this patent is extended or adjusted under 35 U.S.C. 154(b) by 44 days.

This patent is subject to a terminal disclaimer.

(21) Appl. No.: 14/231,716

(22) Filed: Mar. 31, 2014

(65) Prior Publication Data

US 2015/0273389 A1  Oct. 1, 2015

(51) Int. Cl.
*B01D 53/22* (2006.01)
*B01D 69/12* (2006.01)
*B01D 71/54* (2006.01)
*B01D 71/38* (2006.01)
*B01D 71/58* (2006.01)
*C08J 9/00* (2006.01)
*C08J 9/28* (2006.01)
*C08J 9/36* (2006.01)

(52) U.S. Cl.
CPC ............ *B01D 53/228* (2013.01); *B01D 69/125* (2013.01); *B01D 71/38* (2013.01); *B01D 71/54* (2013.01); *B01D 71/58* (2013.01); *C08J 9/286* (2013.01); *C08J 9/365* (2013.01); *B01D 2053/221* (2013.01); *B01D 2325/20* (2013.01); *C08J 2201/026* (2013.01); *C08J 2201/0502* (2013.01); *C08J 2375/04* (2013.01)

(58) Field of Classification Search
CPC .... B01D 53/228; B01D 69/125; B01D 71/38; B01D 71/54; B01D 71/58; B01D 2053/221; B01D 2325/20; C08J 9/0061
USPC .................................. 95/50; 96/4, 11, 13, 14
See application file for complete search history.

(56) References Cited

U.S. PATENT DOCUMENTS

| | | | | |
|---|---|---|---|---|
| 3,903,232 | A * | 9/1975 | Wood et al. ................... | 264/157 |
| 4,426,292 | A * | 1/1984 | Wernick et al. ............... | 210/635 |
| 6,843,829 | B2 * | 1/2005 | Simmons .......................... | 96/14 |
| 7,758,751 | B1 * | 7/2010 | Liu et al. ............................ | 96/4 |
| 8,083,833 | B2 * | 12/2011 | Liu et al. ........................... | 95/45 |
| 9,045,582 | B2 * | 6/2015 | Liu et al. ............................... | 1/1 |
| 2004/0050250 | A1 * | 3/2004 | Pinnau et al. ..................... | 95/45 |
| 2007/0179210 | A1 * | 8/2007 | Swaniker ........................ | 521/172 |
| 2010/0076104 | A1 * | 3/2010 | Wibaux et al. ................ | 521/175 |
| 2012/0067812 | A1 * | 3/2012 | Muratani et al. .............. | 210/490 |
| 2014/0251897 | A1 * | 9/2014 | Livingston et al. ............... | 96/13 |

* cited by examiner

*Primary Examiner* — Jason M Greene

(57) ABSTRACT

The present invention involves a type of nanoporous macrocycle-containing cross-linked polymeric membrane, a method of making the membrane, and the use of such a novel membrane system for natural gas liquids (NGL) recovery, fuel gas conditioning, natural gas pre-treatment, sulfur removal from fluidized catalytic cracking (FCC) and other naphtha streams, as well as aromatic separations such as aromatic/paraffin separation and xylene separation. The nanoporous macrocycle-containing cross-linked polymeric membrane is prepared from a diisocyanate-terminated polyether or a diisocyanate-terminated polyester, that is crosslinked with a nanoporous macrocycle comprising hydroxyl functional groups such as α-, β-, and γ-cyclodextrins.

17 Claims, 1 Drawing Sheet

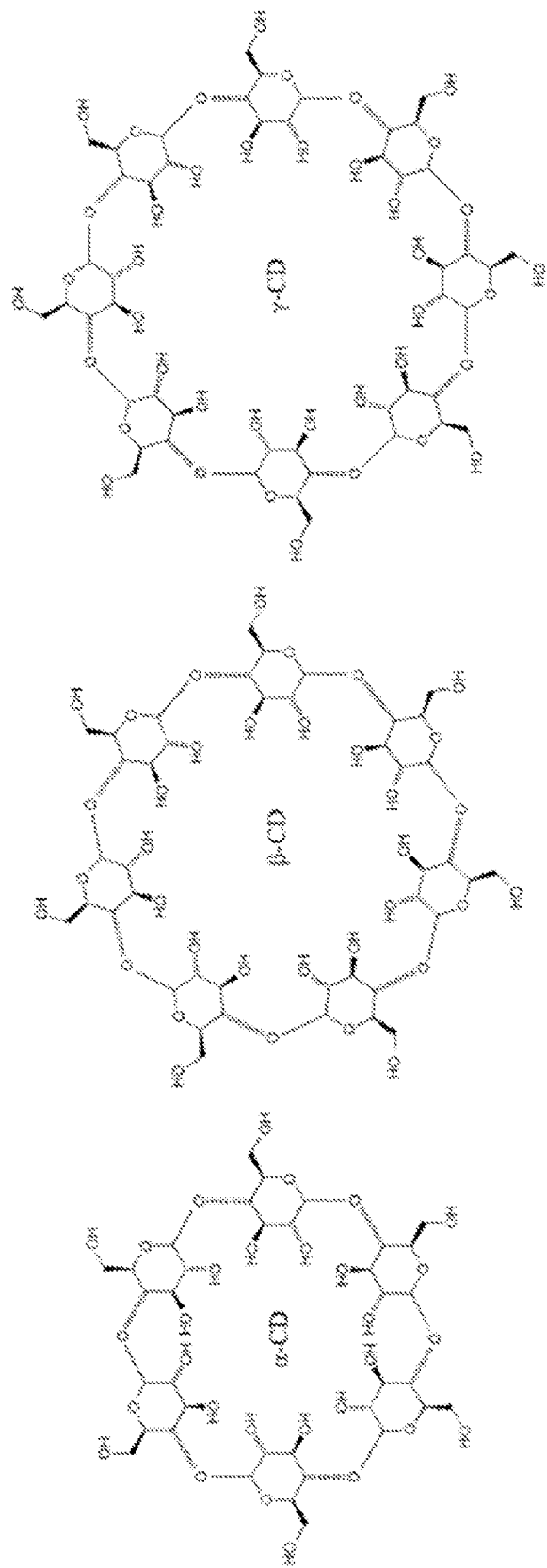

NANOPOROUS MACROCYCLE-CONTAINING CROSS-LINKED POLYMERIC MEMBRANES FOR SEPARATIONS

BACKGROUND OF THE INVENTION

In the past 30-35 years, the state of the art of polymer membrane-based gas separation processes has evolved rapidly. Membrane-based technologies have advantages of both low capital cost and high-energy efficiency compared to conventional separation methods. Membrane gas separation is of special interest to petroleum producers and refiners, chemical companies, and industrial gas suppliers. Several applications have achieved commercial success, including carbon dioxide removal from natural gas and from biogas and enhanced oil recovery, and also in hydrogen removal from nitrogen, methane, and argon in ammonia purge gas streams.

However, it was demonstrated in practice that the membrane performance can deteriorate very quickly without the use of a pretreatment system. The major reason for the loss of membrane performance is heavy hydrocarbon liquid condensation on the membrane surface. Condensation can be prevented by providing a sufficient dew point margin for operation, based on the calculated dew point of the membrane product gas. UOP's MemGuard™ system, a pretreatment regenerable adsorbent system that uses molecular sieves, was developed to remove water as well as heavy hydrocarbons ranging from $C_6$ to $C_{35}$ from the natural gas stream, hence, to lower the dew point of the stream. The selective removal of heavy hydrocarbons by a pretreatment system can significantly improve the performance of the membranes.

Although these pretreatment systems can effectively remove heavy hydrocarbons from natural gas streams to control the dew point of natural gas, the cost is very high. Some commercial membrane projects showed that the cost of the pretreatment system was as high as 10 to 40% of the total cost (pretreatment system and membrane system) depending on the feed composition. Reduction of the pretreatment system cost or total elimination of the pretreatment system would significantly reduce the membrane system cost for natural gas upgrading. On the other hand, in recent years, more and more membrane systems have been applied to large offshore natural gas upgrading projects. For offshore projects, the footprint is a big constraint. Hence, reduction of footprint is very important for offshore projects. The footprint of the pretreatment system is also very high at more than 10-50% of the footprint of the whole membrane system. Therefore, the removal of the pretreatment system from the membrane system will remarkably reduce the cost and footprint of the membrane system especially for offshore natural gas applications such as floating production storage and offloading vessel (FPSO) applications.

Conditioned natural gas has been used as fuel gas in gas engines and turbines in the hydrocarbon processing industry particularly for offshore platforms and remote locations and will be used in future floating liquefied natural gas (FLNG) and FPSO applications. To improve the reliability and reduce unscheduled downtime of the equipment that is used for fuel gas conditioning, a simple fuel gas conditioning technology is required. Rubbery polymeric membranes that can selectively and efficiently permeate heavy hydrocarbons and other contaminants such as $CO_2$, $H_2S$, and water vapor will allow conditioning of fuel gas.

A rubbery polymeric membrane that can selectively permeate condensable heavy hydrocarbon vapors such as C3+ hydrocarbons and can reject non-condensable gases such as methane can also be used for natural gas liquid (NGL) recovery.

The present invention describes a new type of nanoporous macrocycle-containing cross-linked polymeric membranes. The introduction of nanoporous macrocycles such as α-, β-, and γ-cyclodextrins (CDs) to rubbery polymeric membranes in the present invention significantly improves both permeance and selectivity of the rubbery polymeric membranes for separations.

SUMMARY OF THE INVENTION

The invention involves a new type of nanoporous macrocycle-containing cross-linked polymeric membrane, their preparation and their use for separation of gases and liquids. These membranes are particularly useful in separating C3+ hydrocarbons from methane and ethane. The membranes are prepared by crosslinking a polymer comprising a diisocyanate-terminated polyester or a diisocyanate-terminated polyether or mixtures thereof with a nanoporous macrocycle comprising hydroxyl functional groups. The preferred macrocycles are cyclodextrins.

The diisocyanate-terminated polyether may have a structure selected from the group consisting of

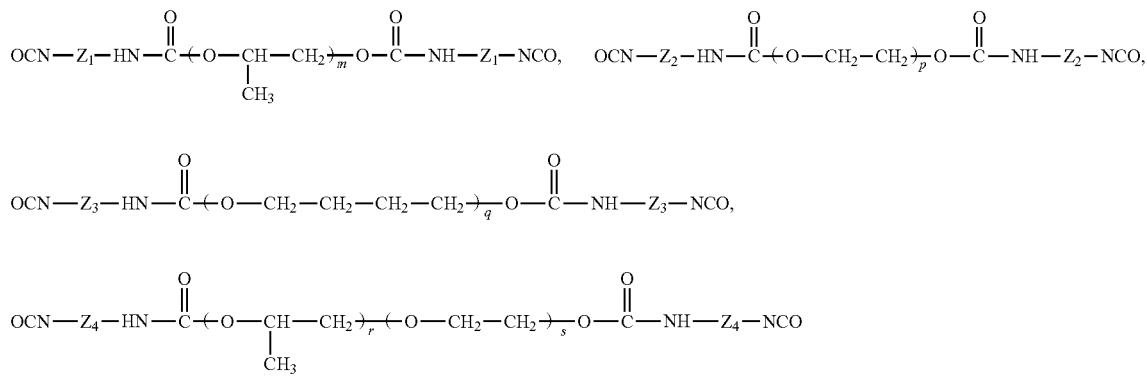

and mixtures thereof; wherein $Z_1$, $Z_2$, $Z_3$, and $Z_4$ are selected from the group consisting of

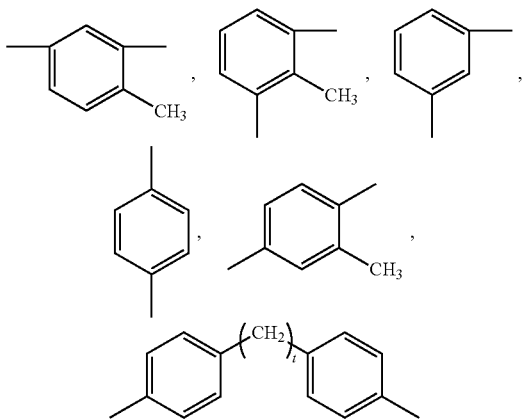

and mixtures thereof, respectively; $Z_1$, $Z_2$, $Z_3$, and $Z_4$ are the same or different from each other and t is an integer from 0 to 4; wherein m, p, q, r, and s are independent integers from 2 to 500.

The diisocyanate-terminated polyester may have a chemical structure comprising

wherein X is selected from the group consisting of

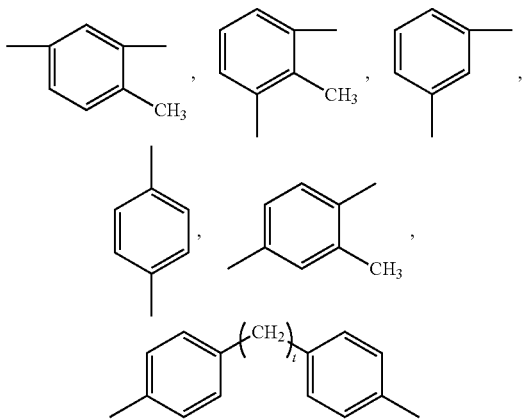

and mixtures thereof; t is an integer from 0 to 4; wherein n is an independent integer from 2 to 500.

The nanoporous macrocycle comprising hydroxyl functional groups may be selected from a group of cyclodextrins consisting of α-cyclodextrin, β-cyclodextrin, and γcyclodextrin (shown in FIG. 1), and mixtures thereof.

BRIEF DESCRIPTION OF THE DRAWING

The FIGURE shows the chemical structure of the cyclodextrins used in embodiments of the invention.

DESCRIPTION OF THE INVENTION

The present invention involves a type of nanoporous macrocycle-containing cross-linked polymeric membrane, a method of making the membrane, and the use of such a novel membrane system for natural gas liquids (NGL) recovery, fuel gas conditioning, natural gas pre-treatment, sulfur removal from fluidized catalytic cracking (FCC) and other naphtha streams, as well as aromatic separations such as aromatic/paraffin separation and xylene separation.

The nanoporous macrocycle-containing cross-linked polymeric membrane described in the current invention comprises a nanoporous macrocycle-containing cross-linked polymer synthesized from a diisocyanate-terminated polyether or a diisocyanate-terminated polyester and a nanoporous macrocycle comprising hydroxyl functional groups such as α-, β-, and γ-CDs. The introduction of nanoporous macrocycles such as α-, β-, and γ-CDs to the diisocyanate-terminated polyether or diisocyanate-terminated polyester resulted in the formation of a cross-linked polymer structure in the present invention. Furthermore, the nanopores of the macrocycles significantly improved the permeance and selectivity of the polymeric membrane for separations.

The nanoporous macrocycle-containing cross-linked polymeric membrane described in the current invention selectively permeates condensable vapors such as $C_3$ to $C_{35}$ hydrocarbons, aromatics, water vapor, carbon dioxide, and hydrogen sulfide and rejects methane and ethane. Fluid streams, including gases and liquids, can be treated for separation of higher hydrocarbons from natural gas. These membranes can also be used for separation of aromatic/aromatic and aromatic/non-aromatic streams. The nanoporous macrocycle-containing cross-linked polymeric membrane described in the current invention has high permeance for condensable vapors, high selectivity for condensable vapors over methane and ethane, and high resistance to liquid chemicals.

The nanoporous macrocycle-containing cross-linked polymeric membrane described in the current invention comprises a nanoporous macrocycle-containing cross-linked polymer formed via the formation of urethane covalent bonds between isocyanate groups on the diisocyanate-terminated polyether or a diisocyanate-terminated polyester and hydroxyl groups on the nanoporous macrocycle.

The nanoporous macrocycle-containing cross-linked polymer membrane in the present invention is prepared by: 1) dissolving the diisocyanate-terminated polyether or diisocyanate-terminated polyester and the macrocycle comprising functional groups such as β-cyclodextrin in a solvent to form a homogeneous solution; 2) heating the solution at a temperature of 30° to 100° C. for 0.5 to 12 hours to form a pre-cross-linked polymer; 3) Coating or casting a layer of the pre-cross-linked polymer solution on a fabric substrate, a clean glass plate, or a relatively porous membrane support (e.g., a support made from inorganic ceramic material or a support made from a polymer); 4) evaporating the solvent and cross-linking pre-cross-linked polymer via heating at a temperature of 30° to 100° C. for 0.5 to 12 hours to provide a nanoporous macrocycle-containing cross-linked polymer membrane with a thin selective layer of nanoporous macrocycle-containing cross-linked polymer. In some cases, an additional coating layer of high permeability polymer is added after step 4) to plug minor membrane defects and protect the membrane selective layer.

The diisocyanate-terminated polyether used for the synthesis of the nanoporous macrocycle-containing cross-linked polymer in the current invention is selected from the group consisting of $$OCN-Z_1-HN-\overset{O}{\underset{}{C}}-(O-\underset{CH_3}{\underset{|}{CH}}-CH_2)_m-O-\overset{O}{\underset{}{C}}-NH-Z_1-NCO,$$

$$OCN-Z_2-HN-\overset{O}{\underset{}{C}}-(O-CH_2-CH_2)_p-O-\overset{O}{\underset{}{C}}-NH-Z_2-NCO,$$

$$OCN-Z_3-HN-\overset{O}{\underset{}{C}}-(O-CH_2-CH_2-CH_2-CH_2)_q-O-\overset{O}{\underset{}{C}}-NH-Z_3-NCO,$$

$$OCN-Z_4-HN-\overset{O}{\underset{}{C}}-(O-\underset{CH_3}{\underset{|}{CH}}-CH_2)_r-(O-CH_2-CH_2)_s-O-\overset{O}{\underset{}{C}}-NH-Z_4-NCO$$

and mixtures thereof; wherein $Z_1$, $Z_2$, $Z_3$, and $Z_4$ are selected from the group consisting of

[chemical structures: tolylene (para-methylphenyl), dimethylphenyl with CH₃, phenyl (meta), para-methylphenyl, dimethylphenyl with CH₃, and diphenylmethane-type $-(CH_2)_t-$ bridged structure]

and mixtures thereof, respectively; $Z_1$, $Z_2$, $Z_3$, and $Z_4$ are the same or different from each other and t is an integer from 0 to 4; wherein m, p, q, r, and s are independent integers from 2 to 500.

The diisocyanate-terminated polyester used for the synthesis of the nanoporous macrocycle-containing cross-linked polymer in the current invention has the following chemical structure $$OCN-X-\overset{H}{\underset{}{N}}-\overset{O}{\underset{}{C}}-(O-CH_2CH_2-O-\overset{O}{\underset{}{C}}-CH_2CH_2CH_2CH_2-\overset{O}{\underset{}{C}})_n-O-CH_2CH_2-O-\overset{O}{\underset{}{C}}-\overset{H}{\underset{}{N}}-X-NCO$$

wherein X is selected from the group consisting of

[chemical structures: para-methylphenyl, dimethylphenyl with CH₃, meta-substituted phenyl]

[chemical structures continued: para-methylphenyl, dimethylphenyl with CH₃, and $-(CH_2)_t-$ bridged bis(methylphenyl)]

and mixtures thereof; t is an integer from 0 to 4; wherein n is an independent integer from 2 to 500.

The nanoporous macrocycle comprising hydroxyl functional groups used for the synthesis of the nanoporous macrocycle-containing cross-linked polymer in the current invention may be selected from a group of cyclodextrins (CDs) consisting of α-, β-, γ-CDs, and mixtures thereof. The chemical structures are shown in FIG. 1.

The solvents used for dissolving the diisocyanate-terminated polyether or diisocyanate-terminated polyester and the nanoporous macrocycle are chosen primarily for their ability to completely dissolve the materials and for ease of solvent removal in the membrane formation steps. Other considerations in the selection of solvents include low toxicity, low corrosive activity, low environmental hazard potential, availability and cost. Representative solvents for use in this invention include, but are not limited to, N-methylpyrrolidone (NMP). N,N-dimethyl acetamide (DMAC), tetrahydrofuran (THF), acetone, N,N-dimethylformamide (DMF), dimethyl sulfoxide (DMSO), 1,3-dioxolane, and mixtures thereof. Other solvents as known to those skilled in the art may also be used.

The nanoporous macrocycle-containing cross-linked polymer membrane in the present invention can be fabricated into any convenient form such as sheet, disk, tube, or hollow fiber. These nanoporous macrocycle-containing cross-linked polymer membrane can also be fabricated into thin film composite membranes incorporating a selective thin nanoporous macrocycle-containing cross-linked polymer layer and a porous supporting layer comprising a polymer material or an inorganic material.

The present invention involves the use of a novel membrane system for natural gas upgrading. This membrane system includes a first-stage nanoporous macrocycle-containing cross-linked polymer membrane described in the present invention to selectively remove hydrocarbons from $C_3$ to $C_{35}$ to control the dew point of natural gas, and a second-stage membrane to selectively remove $CO_2$ from natural gas. The new membrane system described in the current invention eliminates the use of high cost and high footprint membrane pretreatment systems. The membrane system described in the current invention does not require an inter-stage compressor. This is because the natural gas with controlled dew point comes out from the retentate side of the first nanoporous macrocycle-containing cross-linked polymer membrane at high pressure and is directly introduced to the second membrane as a high pressure feed. Therefore, the membrane system significantly reduces the footprint and cost of the membrane system for natural gas upgrading compared to the current commercially available membrane systems that include a non-membrane-related pretreatment system. The membranes most commonly used for commercial natural gas upgrading applications such as cellulose acetate and polyimide are glassy polymers. These membranes, however, cannot be used to control the dew point of natural gas because they are more selectively permeable for $CH_4$ than for hydrocarbons from $C_3$ to $C_{35}$. Pretreatment system is necessary when using these commercial glassy polymer membranes for natural gas upgrading. The membrane used as the second-stage membrane in the new membrane system described in the current invention has higher $CO_2/CH_4$ selectivity than the first-stage nanoporous macrocycle-containing cross-linked polymer membrane described in the present invention for natural gas upgrading. Preferably the membrane materials for the second-stage membrane in the new membrane system described in the current invention have $CO_2/CH_4$ selectivity of 10 or higher at 50° C. under 6.89 MPa (1000 psig) feed gas pressure and with 10% $CO_2$ and 90% $CH_4$ in the feed gas. The membrane materials for the second-stage membrane in the new membrane system described in the current invention can be selected from, but is not limited to, polyacrylonitrile, polysulfones; sulfonated polysulfones; polyetherimides such as Ultem; cellulosic polymers, such as cellulose acetate and cellulose triacetate; polyamides; polyimides such as Matrimid and P84 or P84HT; polyamide/imides; polyketones, polyether ketones; poly(arylene oxides) such as poly(phenylene oxide) and poly(xylene oxide); poly(esteramide-diisocyanate); polyurethanes; polyesters (including polyarylates), such as poly(ethylene terephthalate), poly(alkyl methacrylates), poly(acrylates), and poly(phenylene terephthalate); polysulfides; polymers from monomers having alpha-olefinic unsaturation in addition to those polymers previously listed including poly(ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amides), poly(vinyl amines), poly(vinyl urethanes), poly(vinyl ureas), poly(vinyl phosphates), and poly(vinyl sulfates); polyallyls; poly(benzobenzimidazole); polyhydrazides; polyoxadiazoles; polytriazoles; poly(benzimidazole); polycarbodiimides; polyphosphazines.

Some preferred polymers used for the preparation of the second-stage membrane in the new membrane system described in the current invention include, but are not limited to, polysulfones; sulfonated polysulfones; polyetherimides such as Ultem; cellulosic polymers such as cellulose acetate and cellulose triacetate; polyamides; polyimides such as P84 and poly(3,3',4,4'-benzophenone tetracarboxylic dianhydride-pyromellitic dianhydride-3,3',5,5'-tetramethyl-4,4'-methylene dianiline) (poly(BTDA-PMDA-TMMDA)); polyamide/imides; polyketones; polyether ketones; and polyacrylonitrile.

The nanoporous macrocycle-containing cross-linked polymer membrane described in the current invention can also be used for NGL recovery from natural gas. The nanoporous macrocycle-containing cross-linked polymer membrane described in the current invention selectively permeates condensable vapors such as $C_3$ to $C_{35}$ hydrocarbons and aromatics, therefore, it can separate C3+ hydrocarbons from methane and ethane to recover NGL.

The nanoporous macrocycle-containing cross-linked polymer membrane described in the current invention can also be used for fuel gas conditioning. Conditioning natural gas has been used as fuel gas in gas engines and turbines in the hydrocarbon processing industry particularly for offshore platforms and remote locations and FLNG and FPSO applications. The nanoporous macrocycle-containing cross-linked polymer membrane described in the current invention has shown high permeance and high selectivity for C3+ hydrocarbons over methane that will allow conditioning of fuel gas.

These membranes can also be used for separation of aromatic/aromatic and aromatic/non-aromatic streams.

EXAMPLES

The following examples are provided to illustrate one or more preferred embodiments of the invention, but are not limited embodiments thereof. Numerous variations can be made to the following examples that lie within the scope of the invention.

Example 1

Preparation of β-CD-Containing Cross-Linked Polyurethane Ether Membranes 7.5 g of poly(propylene glycol) toluene 2,4-diisocyanate terminated (abbreviated as PUE) was dissolved in 40 g of anhydrous DMF solvent under stirring to form a homogeneous solution. A certain amount of β-CD (from 1 g to 7.5 g) was added to the solution under stirring. The solution was mixed for 1 hour at 60° C. to form a homogeneous solution. The solution was degassed for 0.5 hour and then cast onto the surface of a clean glass plate (for the formation of dense film membranes: β-CD-containing cross-linked polyurethane ether dense film membranes β-CD-PUE-5-1 and β-CD-PUE-3-1 were prepared from 3.6/1 and 7.5/1 (weight ratio) of PUE/β-CD, respectively) or dip coated on the surface of a relatively porous membrane support (for the formation of thin film composite membrane). The DMF solvent was evaporated at 50-60° C. for 12 hours. The resulting membranes were dried at 70-150° C. to form β-CD-containing cross-linked polyurethane ether dense film or thin film composite membranes.

Comparative Example 1

Preparation of Cross-Linked Polyurethane Ether Dense Film Membrane without β-CD (Abbreviated as PUE without β-CD)

15.0 g of PUE was dissolved in 30 g of anhydrous DMF solvent under stirring to form a homogeneous solution. 1.1 g of 3,3,3',3'-tetramethyl-1,1"-spirobisindane-5,5',6,6'-tetrol was added to the solution under stirring. The solution was mixed for 1 hour at 60° C. to form a homogeneous solution. The solution was degassed for 1 hour and then cast onto the surface of a clean glass plate. The DMF solvent was evaporated at 50° C. for 12 hours. The resulting membrane was detached from the glass plate and further dried at 120° C. for 24 hours in vacuum to form PUE without β-CD dense film membrane.

Example 2

Evaluation of Separation Performance of β-CD-Containing Cross-Linked Polyurethane Ether Dense Film Membranes The following Table shows the pure-gas permeabilities and selectivities of the β-CD-containing cross-linked polyurethane ether dense films (β-CD-PUE-5-1 and β-CD-PUE-3-1). The permeabilities ($P_A$) and selectivities ($\alpha_{A/B}$) of the β-CD-containing cross-linked polyurethane ether dense films for $CH_4$, $CO_2$, propane ($C_3H_8$), and n-butane (n-$C_4H_{10}$) were measured by pure gas measurements at 50° C. It can be seen from the Table that the β-CD-containing cross-linked polyurethane ether dense films has >200 Barrers of $CO_2$ permeability, which is much higher than traditional polymer membranes such as CA, Matrimid polyimide, and Ultem polyetherimide membranes. Different from these traditional polymer membranes which are more permeable to small gases, such as $CH_4$, than to large, condensable organic vapors, such as $C_3H_8$ and n-$C_4H_{10}$, the results in the Table have shown that the β-CD-containing cross-linked polyurethane ether dense films are much more permeable to large, condensable organic vapors, such as $C_3H_8$ and n-$C_4H_{10}$, than to small, permanent gases, such as $CH_4$. Therefore, the β-CD-containing cross-linked polyurethane ether membranes can be used to selectively remove water and hydrocarbons from $C_3$ to $C_{35}$ to control the dew point of natural gas for natural gas processing. The high pressure retentate from the β-CD-containing cross-linked polyurethane ether membranes mainly comprises $CH_4$, $CO_2$, and trace amount of ethane and propane, and some other components.

TABLE

Pure-gas permeation test results of β-CD-containing cross-linked polyurethane ether dense film membranes of β-CD-PUE-5-1 and β-CD-PUE-3-1

| Gas | PUE without β-CD | | β-CD-PUE-5-1 | | β-CD-PUE-3-1 | |
|---|---|---|---|---|---|---|
| | $P_{gas}$ (Barrer) | $\alpha_{gas/CH4}$ | $P_{gas}$ (Barrer) | $\alpha_{gas/CH4}$ | $P_{gas}$ (Barrer) | $\alpha_{gas/CH4}$ |
| $CH_4$ [a] | 33.7 | — | 34.6 | — | 54.8 | — |
| $CO_2$ [a] | 222.1 | 6.5 | 228.3 | 6.6 | 359.4 | 6.6 |
| Propane ($C_3H_8$) [a] | 205.5 | 6.1 | 244.3 | 7.1 | 409.8 | 7.5 |
| n-Butane (n-$C_4H_{10}$) [b] | 343.3 | 10.2 | 460.8 | 13.3 | 697.8 | 12.7 |

[a] Tested at 50 °C. and 791 kPa (100 psig);
[b] Tested at 50° C. and 170 kPa (10 psig);
1 Barrer = $10^{-10}$ $cm^3$(STP) · cm/$cm^2$ · sec · cmHg.

Specific Embodiments

While the following is described in conjunction with specific embodiments, it will be understood that this description is intended to illustrate and not limit the scope of the preceding description and the appended claims.

A first embodiment of the invention is a polymer composition comprising a diisocyanate-terminated polyester, a diisocyanate-terminated polyether or mixtures thereof crosslinked with a nanoporous macrocycle comprising hydroxyl functional groups. An embodiment of the invention is one, any or all of prior embodiments in this paragraph up through the first embodiment in this paragraph wherein in the polymer composition the diisocyanate-terminated polyether has a structure selected from the group consisting of

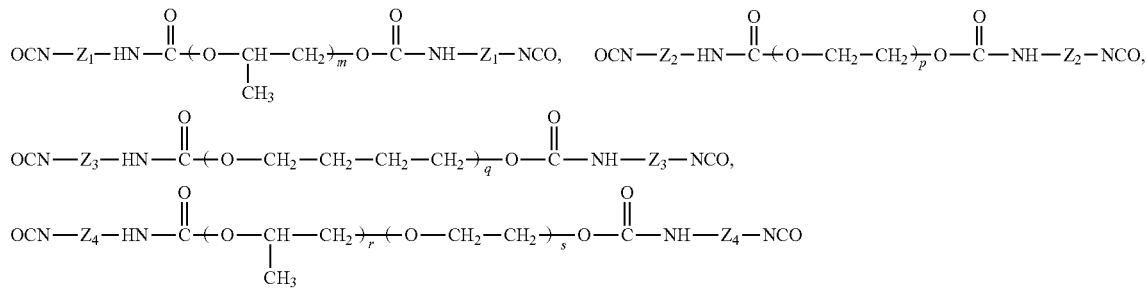

and mixtures thereof; wherein $Z_1$, $Z_2$, $Z_3$, and $Z_4$ are selected from the group consisting of

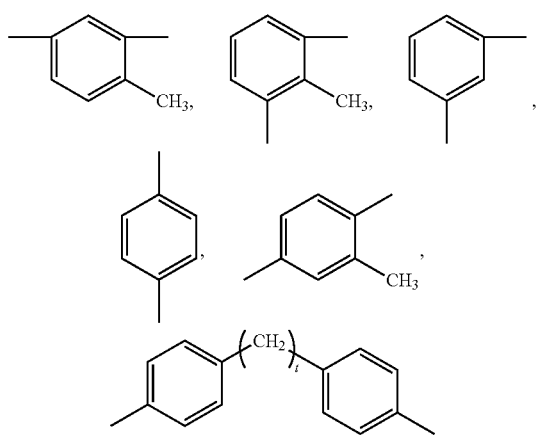

and mixtures thereof, respectively; $Z_1$, $Z_2$, $Z_3$, and $Z_4$ are the same or different from each other and t is an integer from 0 to 4; wherein m, p, q, r, and s are independent integers from 2 to 500. An embodiment of the invention is one, any or all of prior embodiments in this paragraph up through the first embodiment in this paragraph wherein the diisocyanate-terminated polyester has a chemical structure comprising

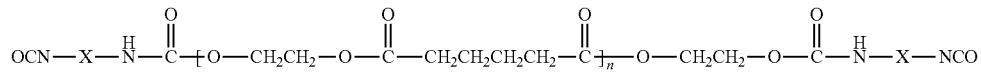

wherein X is selected from the group consisting of

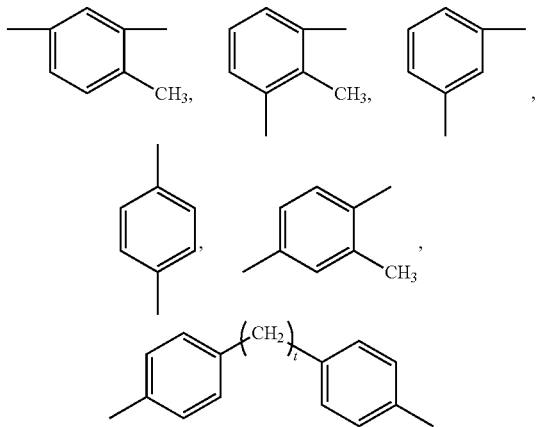

and mixtures thereof; t is an integer from 0 to 4; wherein n is an independent integer from 2 to 500. An embodiment of the invention is one, any or all of prior embodiments in this paragraph up through the first embodiment in this paragraph wherein the nanoporous macrocycle comprising hydroxyl functional groups is selected from a group of cyclodextrins consisting of α-cyclodextrin, β-cyclodextrin, and γ-cyclodextrin, and mixtures thereof. An embodiment of the invention is one, any or all of prior embodiments in this paragraph wherein a membrane comprises the polymer composition set forth above.

A second embodiment of the invention is a method for preparing a nanoporous macrocycle-containing cross-linked polymer membrane comprising (a) dissolving a diisocyanate-terminated polyether or a diisocyanate-terminated polyester and a nanoporous macrocycle comprising hydroxyl functional groups in a solvent to form a homogeneous solution; (b) heating the homogeneous solution at a temperature from about 30° C. to 100° C. for about 0.5 to 12 hours to form a pre-cross-linked polymer solution; (c) coating or casting a layer of the pre-cross-linked polymer solution on a fabric substrate, a clean glass plate, or a relatively porous membrane support; and (d) evaporating the solvent and cross-linking the pre-cross-linked polymer via heating at a temperature from about 30° to 100° C. for about 0.5 to 12 hours to provide a nanoporous macrocycle-containing cross-linked polymer membrane. An embodiment of the invention is one, any or all of prior embodiments in this paragraph up through the second embodiment in this paragraph wherein the relatively porous membrane support comprises a polymer or an inorganic ceramic material. An embodiment of the invention is one, any or all of prior embodiments in this paragraph up through the second embodiment in this paragraph wherein the diisocyanate-terminated polyether has a structure selected from the group consisting of

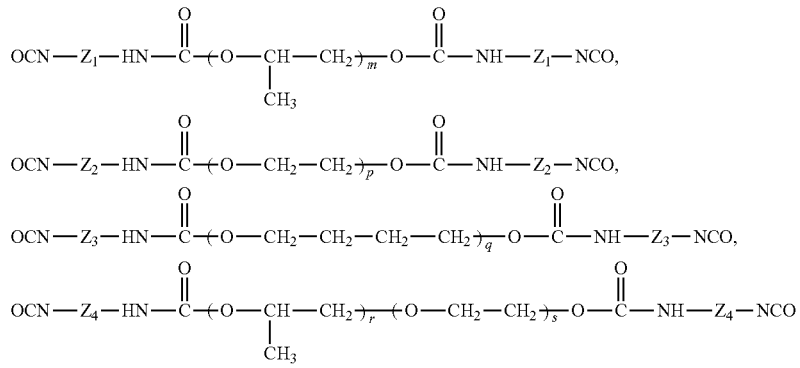

and mixtures thereof; wherein $Z_1$, $Z_2$, $Z_3$, and $Z_4$ are selected from the group consisting of

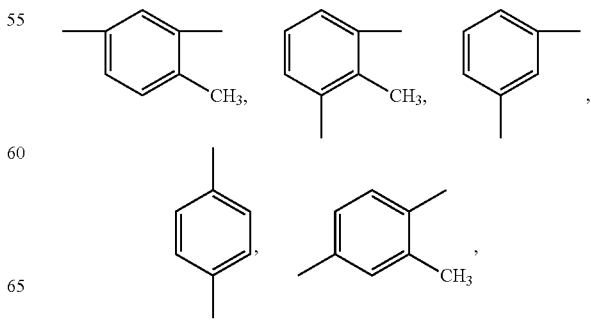

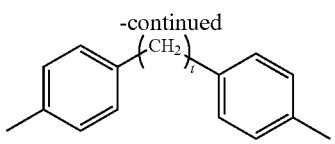

and mixtures thereof, respectively; $Z_1$, $Z_2$, $Z_3$, and $Z_4$ are the same or different from each other and t is an integer from 0 to 4; and wherein m, p, q, r, and s are independent integers from 2 to 500. An embodiment of the invention is one, any or all of prior embodiments in this paragraph up through the second embodiment in this paragraph wherein the diisocyanate-terminated polyester has a chemical structure comprising

wherein X is selected from the group consisting of

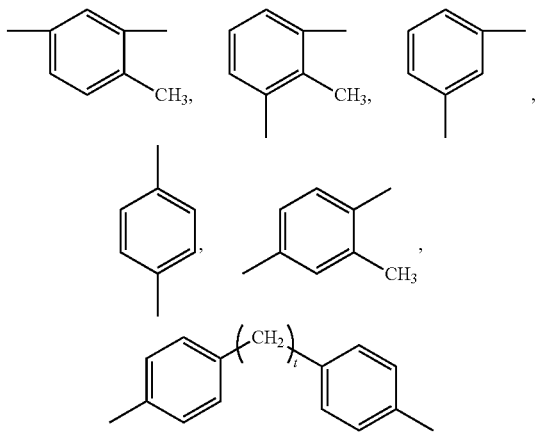

and mixtures thereof; t is an integer from 0 to 4; wherein n is an independent integer from 2 to 500. An embodiment of the invention is one, any or all of prior embodiments in this paragraph up through the second embodiment in this paragraph wherein the nanoporous macrocycle comprising hydroxyl functional groups is selected from a group of cyclodextrins consisting of α-cyclodextrin, β-cyclodextrin, and γ-cyclodextrin, and mixtures thereof. An embodiment of the invention is one, any or all of prior embodiments in this paragraph up through the second embodiment in this paragraph wherein the solvent is selected from the group consisting of N-methylpyrrolidone (NMP), N,N-dimethyl acetamide (DMAC), tetrahydrofuran (THF), acetone, N,N-dimethylformamide (DMF), dimethyl sulfoxide (DMSO), 1,3-dioxolane, and mixtures thereof. An embodiment of the invention is one, any or all of prior embodiments in this paragraph up through the second embodiment in this paragraph further comprising applying a coating layer comprising a high permeability polymer.

A third embodiment of the invention is a process for separating gas or liquid mixtures comprising contacting a gas or liquid mixture to a nanoporous macrocycle-containing cross-linked polymer membrane and recovering a permeate gas or liquid having a higher concentration of one of the gases or liquids in the gas or liquid mixture and recovering a retentate gas or liquid having a higher concentration of at least one other gas or liquid. An embodiment of the invention is one, any or all of prior embodiments in this paragraph up through the third embodiment in this paragraph wherein the nanoporous macrocycle-containing cross-linked polymer comprises a diisocyanate-terminated polyester, a diisocyanate-terminated polyether or mixtures thereof crosslinked with a cyclodextrin. An embodiment of the invention is one, any or all of prior embodiments in this paragraph up through the third embodiment in this paragraph wherein the gas or liquid mixture comprises natural gas liquids in a natural gas stream. An embodiment of the invention is one, any or all of prior embodiments in this paragraph up through the third embodiment in this paragraph wherein the gas or liquid mixtures is contacted with the nanoporous macrocycle-containing cross-linked polymer membrane and then is sent to contact a second stage membrane comprising a polymer selected from the group consisting of polyacrylonitrile, polysulfones; sulfonated polysulfones; polyetherimides; cellulosic polymers; polyamides; polyimides; polyamide/imides; polyketones, polyether ketones; poly(arylene oxides); poly(esteramide-diisocyanate); polyurethanes; polyesters; polysulfides; poly(ethylene), poly(propylene), poly(butene-1), poly(4-methyl pentene-1), polyvinyls, poly(vinyl chloride), poly(vinyl fluoride), poly(vinylidene chloride), poly(vinylidene fluoride), poly(vinyl alcohol), poly(vinyl esters), poly(vinyl pyridines), poly(vinyl pyrrolidones), poly(vinyl ethers), poly(vinyl ketones), poly(vinyl aldehydes); polyallyls; poly(benzobenzimidazole); polyhydrazides; polyoxadiazoles; polytriazoles; poly(benzimidazole); polycarbodiimides; and polyphosphazines. An embodiment of the invention is one, any or all of prior embodiments in this paragraph up through the third embodiment in this paragraph wherein the nanoporous macrocycle-containing cross-linked polymer membrane selectively removes hydrocarbons from $C_3$ to $C_{35}$ to control the dew point of natural gas and the second stage membrane selectively removes carbon dioxide from the natural gas. An embodiment of the invention is one, any or all of prior embodiments in this paragraph up through the third embodiment in this paragraph wherein C3+ hydrocarbons are separated from methane and ethane. An embodiment of the invention is one, any or all of prior embodiments in this paragraph up through the third embodiment in this paragraph wherein mixtures of aromatic compounds are separated or mixtures of aromatic and nonaromatic compounds are separated. An embodiment of the invention is one, any or all of prior embodiments in this paragraph up through the third embodiment in this paragraph wherein C3+ hydrocarbons are separated from methane in a process to condition fuel gas.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A membrane comprising a diisocyanate-terminated polyester, a diisocyanate-terminated polyether or mixtures thereof crosslinked with a nanoporous macrocycle comprising hydroxyl functional groups.

2. The membrane of claim 1 wherein said a diisocyanate-terminated polyether has a structure selected from the group consisting of

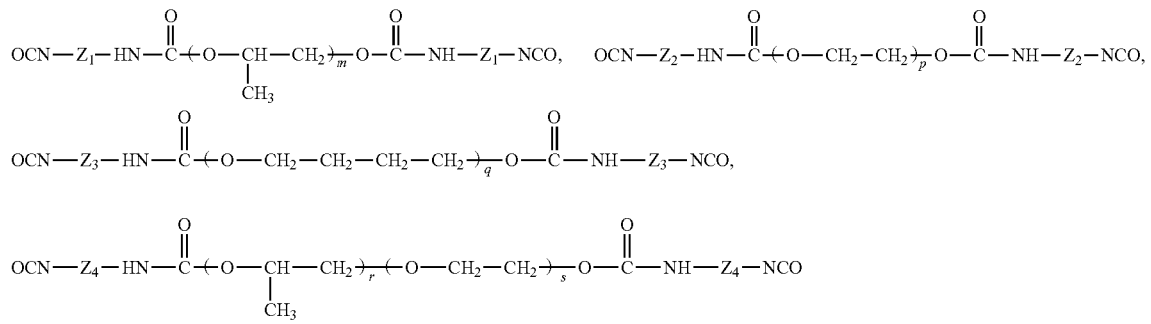

and mixtures thereof; wherein $Z_1$, $Z_2$, $Z_3$, and $Z_4$ are selected from the group consisting of

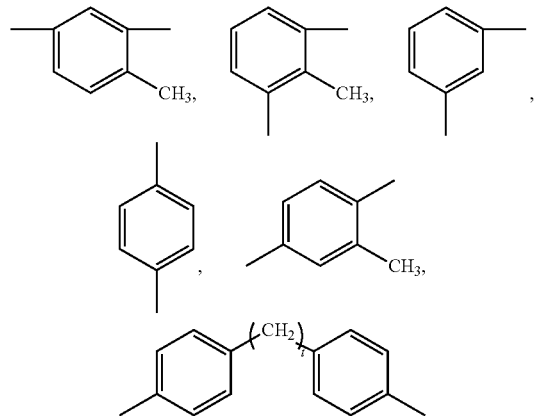

and mixtures thereof, respectively; $Z_1$, $Z_2$, $Z_3$, and $Z_4$ are the same or different from each other and t is an integer from 0 to 4; wherein m, p, q, r, and s are independent integers from 2 to 500.

3. The membrane of claim 1 wherein said diisocyanate-terminated polyester has a chemical structure comprising

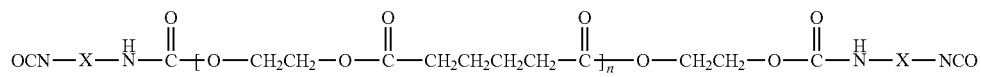

wherein X is selected from the group consisting of

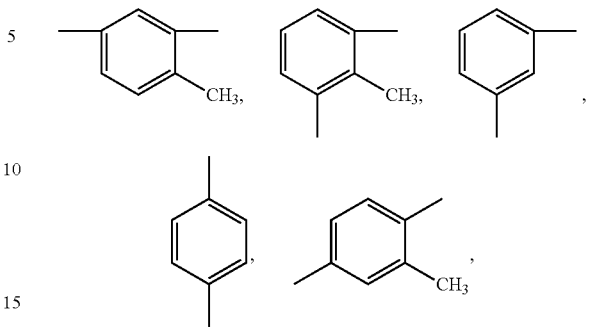

-continued

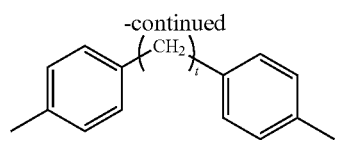

and mixtures thereof; t is an integer from 0 to 4; wherein n is an independent integer from 2 to 500.

4. The membrane of claim 1 wherein said nanoporous macrocycle comprising hydroxyl functional groups is selected from a group of cyclodextrins consisting of α-cyclodextrin, β-cyclodextrin, and γ-cyclodextrin, and mixtures thereof.

5. A method for preparing a nanoporous macrocycle-containing cross-linked polymer membrane comprising:
(a) dissolving a diisocyanate-terminated polyether or a diisocyanate-terminated polyester and a nanoporous macrocycle comprising hydroxyl functional groups in a solvent to form a homogeneous solution, wherein said nanoporous macrocycle comprising hydroxyl functional groups is selected from a group of cyclodextrins consisting of α-cyclodextrin, β-cyclodextrin, and γ-cyclodextrin, and mixtures thereof;
(b) heating said homogeneous solution at a temperature from about 30° C. to 100° C. for about 0.5 to 12 hours to form a pre-cross-linked polymer solution;

(c) coating or casting a layer of said pre-cross-linked polymer solution on a fabric substrate, a clean glass plate, or a relatively porous membrane support; and (d) evaporating the solvent and cross-linking said pre-cross-linked polymer via heating at a temperature from about 30° to 100° C. for about 0.5 to 12 hours to provide a nanoporous macrocycle-containing cross-linked polymer membrane.

6. The method of claim 5 wherein said relatively porous membrane support comprises a polymer or an inorganic ceramic material.

7. The method of claim 5 wherein said diisocyanate-terminated polyether has a structure selected from the group consisting of

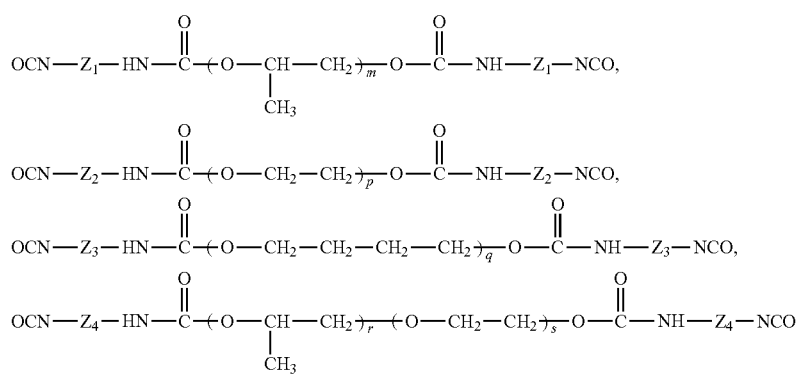

and mixtures thereof; wherein $Z_1$, $Z_2$, $Z_3$, and $Z_4$ are selected from the group consisting of

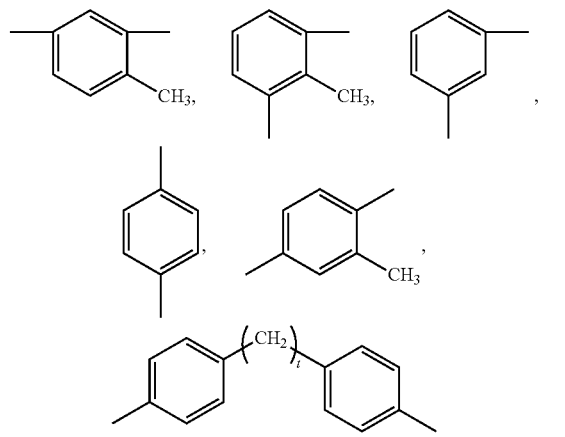

and mixtures thereof, respectively; $Z_1$, $Z_2$, $Z_3$, and $Z_4$ are the same or different from each other and t is an integer from 0 to 4; and wherein m, p, q, r, and s are independent integers from 2 to 500.

8. The method of claim 5 wherein said diisocyanate-terminated polyester has a chemical structure comprising

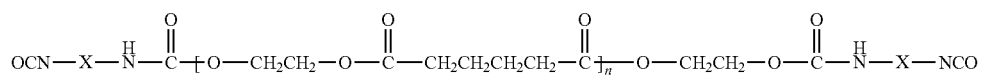

wherein X is selected from the group consisting of

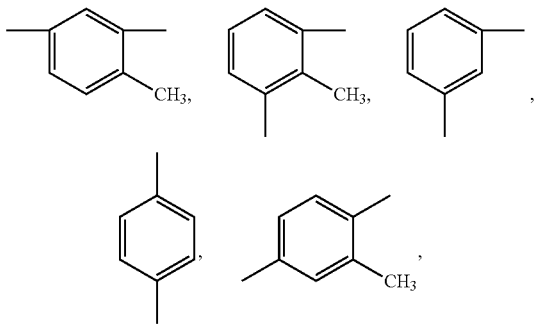

-continued

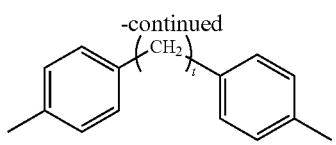

and mixtures thereof; t is an integer from 0 to 4; wherein n is an independent integer from 2 to 500.

9. The method of claim 5 wherein said solvent is selected from the group consisting of N-methylpyrrolidone (NMP), N,N-dimethyl acetamide (DMAC), tetrahydrofuran (THF), acetone, N,N-dimethylformamide (DMF), dimethyl sulfoxide (DMSO), 1,3-dioxolane, and mixtures thereof.

10. The method of claim 5 further comprising applying a coating layer comprising a high permeability polymer.

11. A process for separating gas or liquid mixtures comprising contacting a gas or liquid mixture to a nanoporous macrocycle-containing cross-linked polymer membrane comprising a diisocyanate-terminated polyester, a diisocyanate-terminated polyether or mixtures thereof crosslinked with a cyclodextrin and recovering a permeate gas or liquid having a higher concentration of one of the gases or liquids in the gas or liquid mixture and recovering a retentate gas or liquid having a higher concentration of at least one other gas or liquid.

12. The process of claim 11 wherein said gas or liquid mixture comprises natural gas liquids in a natural gas stream.

13. The process of claim 11 wherein said gas or liquid mixtures is contacted with said nanoporous macrocycle-containing cross-linked polymer membrane and then is sent to contact a second stage membrane comprising a polymer selected from the group consisting of polyacrylonitrile, polysulfones; sulfonated polysulfones; polyetherimides; cellulosic polymers; polyamides; polyimides; polyamide/imides; polyketones, polyether ketones; poly(arylene oxides); poly(esteramide-diisocyanate); polyurethanes; polyesters; polysulfides; poly(ethylene), poly(propylene), poly(butene-1), poly(4-methyl pentene-1), polyvinyls, poly(vinyl chloride), poly(vinyl fluoride), poly(vinylidene chloride), poly(vinylidene fluoride), poly(vinyl alcohol), poly(vinyl esters), poly(vinyl pyridines), poly(vinyl pyrrolidones), poly(vinyl ethers), poly(vinyl ketones), poly(vinyl aldehydes); polyallyls; poly(benzobenzimidazole); polyhydrazides; polyoxadiazoles; polytriazoles; poly(benzimidazole); polycarbodiimides; and polyphosphazines.

14. The process of claim 13 wherein said nanoporous macrocycle-containing cross-linked polymer membrane selectively removes hydrocarbons from C3 to C35 to control the dew point of natural gas and said second stage membrane selectively removes carbon dioxide from said natural gas.

15. The process of claim 11 wherein C3+ hydrocarbons are separated from methane and ethane.

16. The process of claim 11 wherein mixtures of aromatic compounds are separated or mixtures of aromatic and non-aromatic compounds are separated.

17. The process of claim 11 wherein C3+ hydrocarbons are separated from methane in a process to condition fuel gas.

* * * * *